(12) United States Patent
Okabe et al.

(10) Patent No.: US 7,874,316 B2
(45) Date of Patent: Jan. 25, 2011

(54) PURGE GAS UNIT AND PURGE GAS SUPPLY INTEGRATED UNIT

(75) Inventors: Tsuneyuki Okabe, Hanamaki (JP); Yoji Mori, Gifu (JP); Takeya Inagaki, Kasugai (JP); Akihito Sugino, Inuyama (JP)

(73) Assignees: CKD Corporation, Komaki (JP); Tokyo Electron Limited, Tokyo (JP)

( * ) Notice: Subject to any disclaimer, the term of this patent is extended or adjusted under 35 U.S.C. 154(b) by 872 days.

(21) Appl. No.: 11/822,387

(22) Filed: Jul. 5, 2007

(65) Prior Publication Data
US 2008/0069702 A1 Mar. 20, 2008

(30) Foreign Application Priority Data
Aug. 11, 2006 (JP) ............................. 2006-219411

(51) Int. Cl.
*F16K 11/10* (2006.01)
(52) U.S. Cl. ...................................... 137/884
(58) Field of Classification Search ................. 137/269, 137/270, 271, 597, 884
See application file for complete search history.

(56) References Cited

U.S. PATENT DOCUMENTS 5,819,782 A * 10/1998 Itafuji ........................ 137/240

| | | | |
|---|---|---|---|
| 6,293,310 B1 * | 9/2001 | Redemann et al. | 137/884 |
| 6,546,961 B2 | 4/2003 | Fukushima | |
| 6,769,463 B2 * | 8/2004 | Vu | 141/98 |
| 2002/0017329 A1 | 2/2002 | Fukushima | |
| 2003/0106597 A1 * | 6/2003 | Ichikawa et al. | 137/884 |

FOREIGN PATENT DOCUMENTS

| JP | A-05-172265 | 7/1993 |
|---|---|---|
| JP | A 11-294697 | 10/1999 |
| JP | A-2005-140259 | 6/2005 |
| JP | A-2006-002850 | 1/2006 |
| JP | A-2006-057645 | 3/2006 |
| JP | A-2006-132598 | 5/2006 |
| KR | 2002-0011331 A | 2/2002 |
| WO | WO 02/093053 A1 | 11/2002 |

* cited by examiner

*Primary Examiner*—John Fox
(74) *Attorney, Agent, or Firm*—Oliff & Berridge, PLC (57) ABSTRACT

To provide a purge gas unit and a purge gas supply integrated unit having a smaller foot space, the purge gas unit comprises an input block for input of purge gas into the purge gas unit, the input block including a purge passage formed through the input block to provide an opening in a side surface of the input block and an input passage formed branching off from the purge passage; an output block for output of the purge gas from the purge gas unit; a communication block connected to the input block and the output block to provide communication between the input block and the output block.

6 Claims, 11 Drawing Sheets

PURGE GAS UNIT AND PURGE GAS SUPPLY INTEGRATED UNIT

BACKGROUND OF THE INVENTION

1. Field of the Invention

The present invention relates to a purge gas unit and a purge gas supply integrated unit, which are arranged to measure a flow rate of purge gas to be supplied to a process gas unit by use of a flow sensor and make feedback control on an open/close control valve based on a measurement result.

2. Description of Related Art

For instance, some semiconductor manufacturing processes include continuous processes in a chamber, e.g., a continuous deposition process on substrates and a cleaning process in the chamber, which are executed by selectively allowing a plurality of process gas units connected to the chamber to communicate with it. This technique is disclosed for example in WO 02/93053.

In this case, if process gas remains in the process gas unit, compositions of the process gas are liable to degenerate before being supplied to the chamber, resulting in a poor yielding percentage. To avoid such disadvantage, the process gas unit is connected to a purge gas line via a purge gas unit to dilute the process gas remaining in a flow passage with purge gas. To stabilize reactions in the chamber at that time, a total flow rate of purge gas needs to be continuously controlled to a fixed value to provide a stable dilution rate of the process gas. Conventional purge gas units are therefore arranged to measure a flow rate of purge gas to be supplied to the process gas unit by use of a flow sensor and make feedback control on an open/close control valve based on a measurement result thereof, thereby allowing purge gas to be supplied in fixed amounts to the process gas unit. This technique is disclosed for example in JP 11(1999)-294697A.

In the conventional purge gas unit, however, the purge gas line is connected to the open/close control valve through pipes. This configuration needs a large foot space (installation space).

Further, the conventional purge gas unit is arranged to receive purge gas through a purge gas common passage provided outside the unit. Thus, a pipe space is required for the purge gas common passage, resulting in a wider foot space. The number of purge gas units is increased in association with the installation of additional process gas units. As the number of arranged gas lines is increased, the foot space would be remarkably problematic. In addition, there is a recent demand for a semiconductor manufacturing system to reduce the apparatus size in order to shorten the gas line to enhance the accuracy of flow rate of process gas. Accordingly, downsizing of the purge gas unit has been requested.

SUMMARY OF THE INVENTION

The present invention has been made in view of the above circumstances and has an object to provide a purge gas unit and a purge gas supply integrated unit having a smaller foot space.

To achieve the purpose of the invention, there is provided a purge gas unit comprising: an input block for input of purge gas into the purge gas unit, the input block including a purge passage formed through the input block to provide an opening in a side surface of the input block and an input passage formed branching off from the purge passage; an output block for output of the purge gas from the purge gas unit; and a communication block connected to the input block and the output block to provide communication between the input block and the output block.

According to another aspect, the invention provides a purge gas unit comprising: an input block for input of purge gas into the purge gas unit; an output block for output of the purge gas from the purge gas unit, the output block including a first opening and a second opening formed opening one above the other in a side surface of the output block, and a communicating passage that connects the first and second openings in fluid communication to each other; a communication block attached to the input block and the output block placed on both sides of the communication block so that a space is provided between the communication block and a mounting surface; a flow sensor attached to an upper surface of the communication block to measure a flow rate of the purge gas that flows through the communication block; and an open/close control valve attached to the output block and placed in the space to communicate with the flow sensor through the communicating passage.

DETAILED DESCRIPTION OF THE PREFERRED EMBODIMENTS

A detailed description of a preferred embodiment of a purge gas unit and a purge gas supply integrated unit embodying the present invention will now be given referring to the accompanying drawings.

<Purge Gas Supply Integrated Unit>

Figure 1:
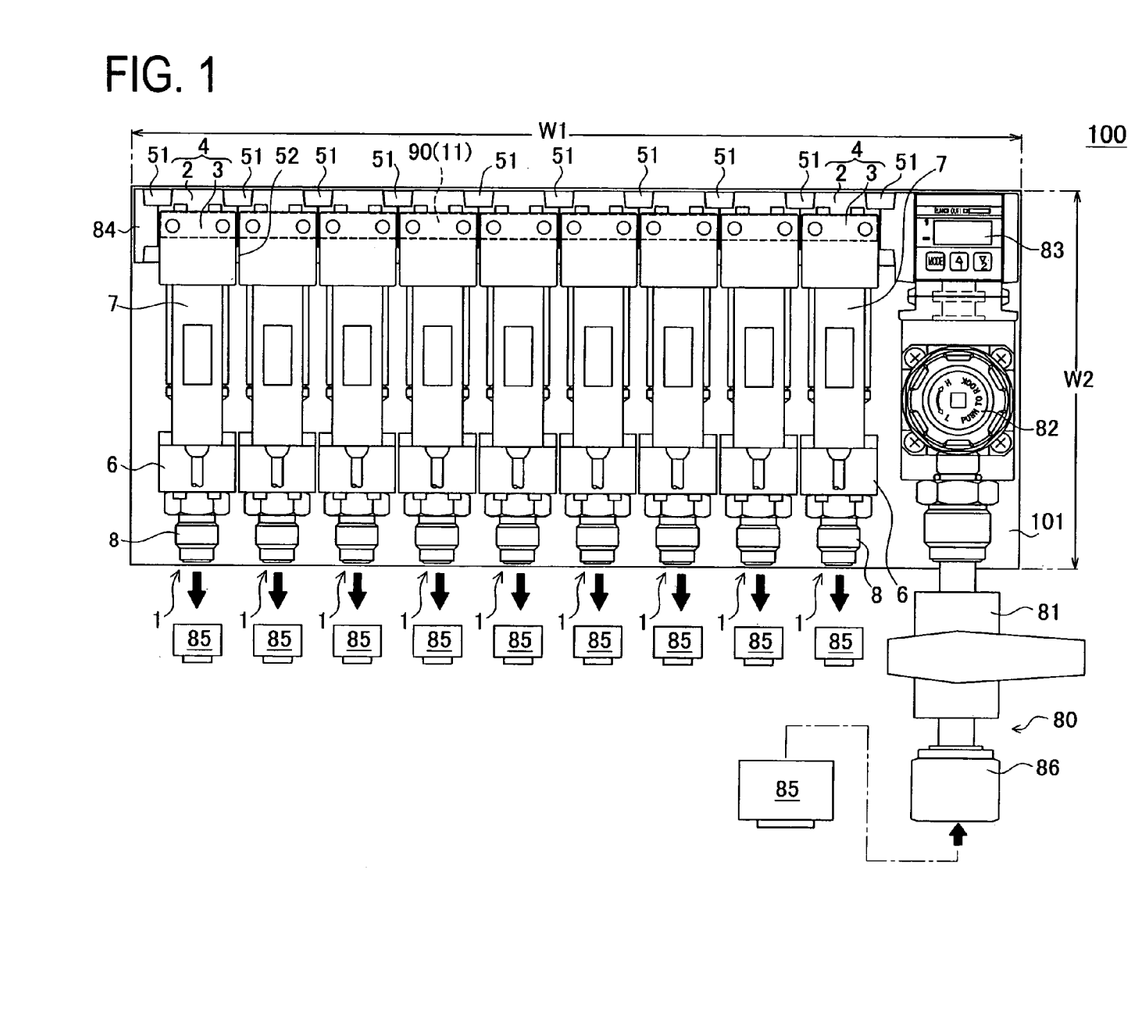
FIG. 1 is a plan view of a purge gas supply integrated unit of a preferred embodiment according to the present invention.

FIG. 1 is a plan view of a purge gas supply integrated unit 100.

This purge gas supply integrated unit 100 is mounted in a semiconductor manufacturing system in the same way as the conventional technique. The semiconductor manufacturing system not shown comprises a plurality of process gas units for supplying various kinds of process gasses to a chamber by selecting or mixing the process gasses. The purge gas supply integrated unit 100 of the present embodiment includes purge gas units 1 of the same number (nine in the present embodiment) as process gas units are mounted and integrated on a mounting plate 101 as well as a purge gas supply control unit 80 to supply purge gas in predetermined amounts to a process gas unit not shown.

The purge gas supply control unit 80 includes a hand-operated valve 81, a regulator 82, and a pressure sensor 83, which are integrally coupled to each other in line. Purge gas is allowed to enter by operation of the hand-operated valve 81 and flow in a purge gas common passage 90 after subjected to pressure control by the regulator 82 and the pressure sensor 83.

The adjoining purge gas units 1 are coupled with connecting members 51 and 52, thereby forming the purge gas common passage 90 extending over the purge gas units 1. Each purge gas unit 1 has a passage configuration for allowing purge gas to flow from the purge gas common passage 90 and into the process gas unit.

<Schematic Configuration of Purge Gas Unit>

Figure 2:
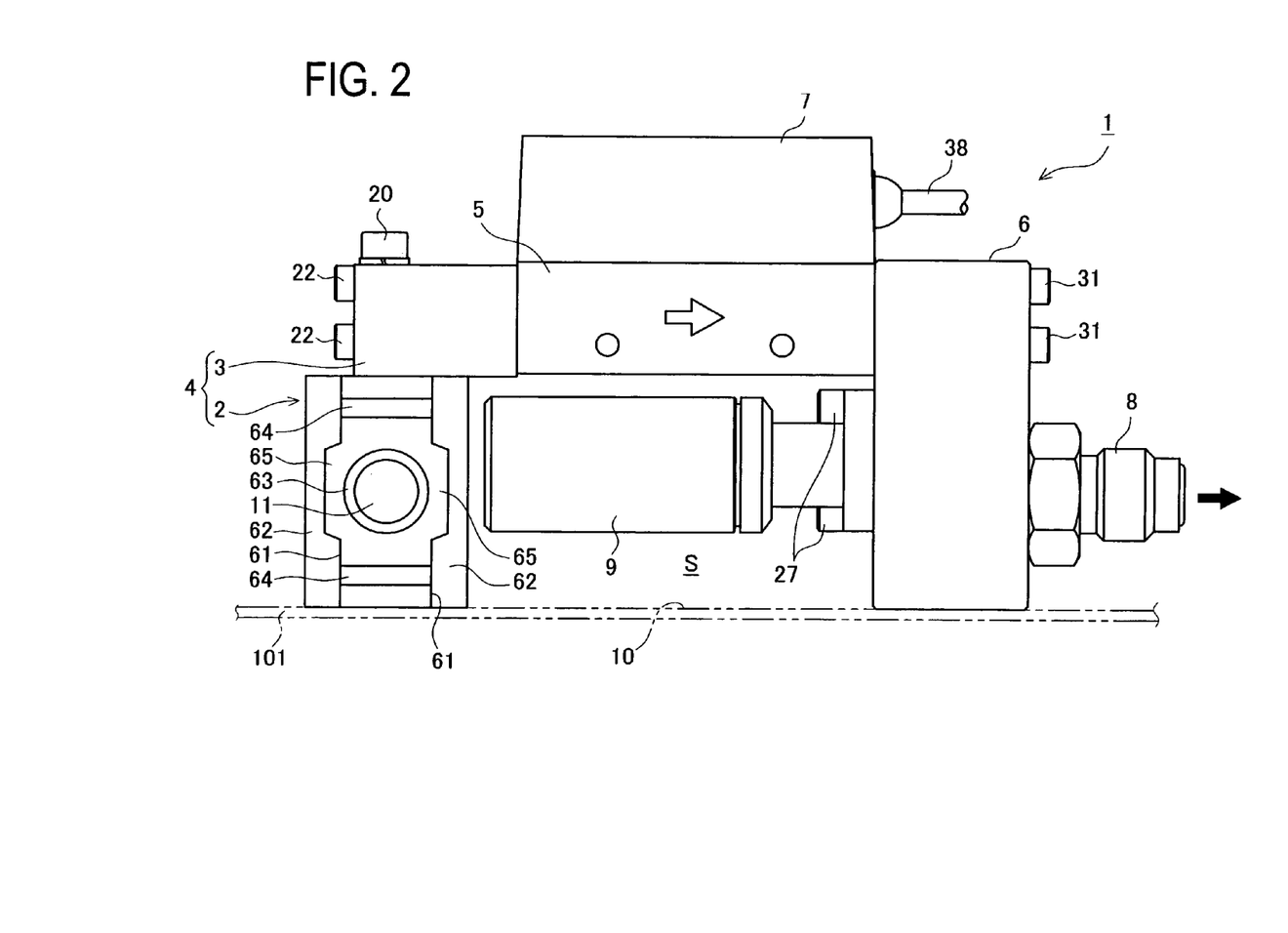
FIG. 2 is a side view of the purge gas unit of FIG. 1.

FIG. 2 is a side view of the purge gas unit 1 of the present embodiment according to the present invention. In the following explanation, the flow sensor 7 side (an upper side in FIG. 2) is referred to as an "Upper side", the mounting plate 101 side (a lower side in FIG. 2) is referred to as a "Lower side", a purge gas upstream side (a left side in FIG. 2) is referred to as an "Input side", and a purge gas downstream side (a right side in FIG. 2) is referred to as an "Output side".

The purge gas unit 1 includes an input block 4, a communication block 5, and an output block 6 are connected in a reversed U-shape to form a flow passage for allowing purge gas input in the input block 4 to pass through the communication block 5 and then be output from the output block 6.

On a top of the communication block 5, the flow sensor 7 is placed to measure a flow rate of the purge gas. The output block 6 is provided with an output joint 8 to which a pipe is joined for connection to the process gas unit. An electromagnetic proportion valve 9, which is an example of an "open/close control valve", is attached to the side of the output block 6 opposite the side provided with the output joint 8. The electromagnetic proportion valve 9 is transversely disposed relative to the output block 6 and placed in a space S provided between the lower surface of the communication block 5 and a unit mounting surface 10 of the unit mounting plate 101. Accordingly, the flow sensor 7 and the electromagnetic proportion valve 9 are disposed in parallel relation. The flow sensor 7 and the electromagnetic proportion valve 9 are connected to a control unit (not shown) of the semiconductor manufacturing system so that operations of the electromagnetic proportion valve 9 are controlled based on measurement results of the flow sensor 7.

<Inner Configuration of Purge Gas Unit>

Figure 3:
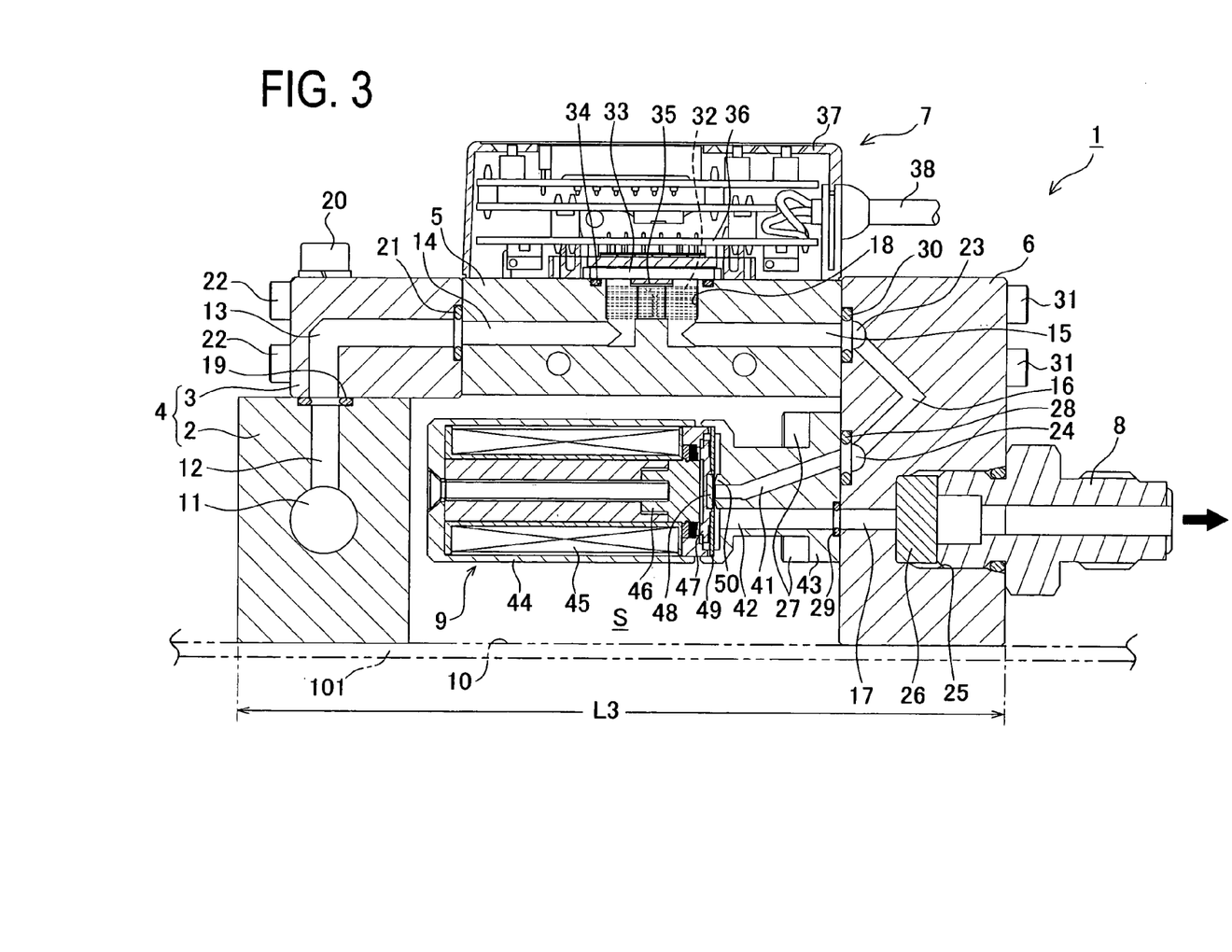
FIG. 3 is a sectional view of the purge gas unit of FIG. 2.

FIG. 3 is a sectional view of the purge gas unit 1 of FIG. 2.

In the purge gas unit 1, the input block 4 and the output block 6 are fixed to the communication block 5 on both sides thereof with bolts 22 and 31 respectively, thus allowing fluid communication between flow passages 11, 12, 13, 14, 15, 16, and 17. Further, the flow sensor 7, the electromagnetic proportion valve 9, and others are unitized.

<Communicating Block>

The communication block 5 is a rectangular parallelepiped component made of aluminum. The communication block 5 is formed with a flow passage for allowing purge gas to flow from the input block 4 to the output block 6 via the flow sensor 7. Specifically, the communication block 5 is formed with a mounting hole 18 that opens in the top of the block 5 and holds a laminated element 32 of the flow sensor 7. The communication block 5 is further formed with a primary flow passage 14 and a secondary flow passage 15, which are bored to open an input side surface and an output side surface of the block 5 respectively and to communicate with the mounting hole 18.

The flow sensor 7 is a thermal flow sensor for measuring a flow rate with a resistive element (a heating coil). The flow sensor 7 includes the laminated element 32, a sensor substrate 33, and others. The laminated element 32 is made of a predetermined number of thin mesh plates and thin spacers (e.g., eleven mesh plates and eleven spacers) that are alternately laminated and adhered. This element is fitted in the mounting hole 18 with no gap. The sensor substrate 33 is used to output an electrical signal representing a measured flow rate and is screw-held to the top of the communication block 5 with a seal-packing 34 interposed therebetween. A measuring chip 35 is mounted on a surface of the sensor substrate 33 that will be exposed to purge gas, and an electric circuit 36 is provided on the other surface of the sensor substrate 33. On a surface of the measuring chip 35 which is in contact with the sensor substrate 33, a groove (not shown) is formed extending in a direction along the flow of purge gas. A heating resistive element (not shown) is placed transversely spanning the groove. The flow sensor 7 includes a cover 37 fixed to the communication block 5 for covering the sensor substrate 33, the electric circuit 36, and others in order to avoid the influence of disturbance on flow measurement. A wire 38 connected to the electric circuit 36 is provided extending out of the cover 37 and connected to a control unit not shown of the semiconductor manufacturing system.

The above flow sensor 7 is configured to allow the purge gas supplied to the primary flow passage 14 to pass through the laminated element 32 fitted in the mounting hole 18, pass through the groove of the measuring chip 35, and pass through the laminated element 32 again to flow in the secondary flow passage 15. At this time, the purge gas that is flowing along the measuring chip 35 draws heat from the heating resistive element (not shown). Thus, the electric circuit 36 measures a flow rate based on a temperature (a resistance value) of the heating resistive element (not shown) and outputs a measurement result to a control unit not shown.

<Input Block>

The input block 4 comprises a passage common block 2 and a direction changing block 3 that are stacked as one body. The input block 4 is formed with a flow passage configured to distribute purge gas from the purge gas common passage 90 to the communication block 5.

The passage common block 2 is a rectangular parallelepiped component made of aluminum. The passage common block 2 is formed with a purge passage 11 extending through the center of the block 2 to open in opposed side surfaces thereof (see FIGS. 4 and 5). The block 2 is further formed with an input passage 12 extending perpendicular to the purge passage 11 to open in the upper surface of the block 2.

The direction changing block 3 is a rectangular parallelepiped component made of aluminum. This block 3 is formed with an L-shaped flow passage 13.

The passage common block 2 and the direction changing block 3 are fixed to each other in such a way that an O-ring 19 made of rubber such as fluorocarbon rubber and a perfluoroelastomer is 1.5 fitted in a connected portion of the input passage 12 and the L-shaped passage 13, and then two bolts 20 are inserted, around the O-ring 19, through the direction changing block 3 and tightened in the passage common block 2. At this time, the O-ring 19 is circumferentially compressed between the passage common block 2 20 and the direction changing block 3, thereby providing sealing strength to prevent fluid leakage from the connected portion between the input passage 12 and the L-shaped passage 13.

The direction changing block 3 of the above input block 4 is connected to the communication block 5 in surface contact relation so that the L-shaped passage 13 of the direction changing block 3 is made continuous with the primary passage 14 of the communication block 5, interposing an O-ring 21 made of rubber such as fluorocarbon rubber and a perfluoroelastomer. Four bolts 22 are inserted through the direction changing block 3, around the O-ring 21, and tightened in the communication block 5. Thus, the input block 4 is fixed to the communication block 5. In this state, the O-ring 21 is compressed with circumferentially uniform force between the direction changing block 3 and the communication block 5, thus providing sealing strength to prevent fluid leakage from the connected portion of the L-shaped passage 13 and the primary passage 14.

<Output Block>

The output block 6 is a rectangular parallelepiped component made of aluminum. The output block 6 is formed with a flow passage for allowing purge gas supplied via the communication block 5 to flow in the electromagnetic proportion valve 9 and then be discharged out through the output joint 8.

The output block 6 is designed to be almost equal in height to the input block 4 so that the input block 4 and the output block 6 hold therebetween the flow sensor 7 in parallel with the unit mounting surface 10.

The output block 6 is formed with a first opening 23 and a second opening 24 which are arranged one above the other to open in the input-side surface of the block 6, and further with a V-shaped passage 16 in laterally facing form in section (for allowing a downward flow), which is an example of a "communicating passage" that connects the first and second openings 23 and 24 in fluid communication with each other. Under the V-shaped passage 16, a discharge passage 17 is formed through the output block 6 to open in the side surface formed with the first and second openings 23 and 24 and in an opposite side surface respectively.

In the output-side surface of the output block 6, a mounting hole 25 is formed coaxially with the discharge passage 17 to receive the output joint 8. The mounting hole 25 is formed with internal screw threads in which external screw threads of the output joint 8 are threadably engaged. In the mounting hole 25 of the output block 6, a filter 26 is pressed and held by pressure of the output joint 8 when tightened.

To such output block 6, the electromagnetic proportion valve 9 is fixed in a transverse orientation with bolts 27 so that the second opening 24 of the V-shaped passage 16 and the discharge passage 17 are aligned with an input passage 41 and an output passage 42 of the electromagnetic proportion valve 9, respectively. In this state, rubber O-rings 28 and 29 made of fluorocarbon rubber, perfluoroelastomer rubber, or the like are fitted between the electromagnetic proportion valve 9 and the output block 6. The O-rings 28 and 29 are elastically deformed when the bolts 27 are tightened, providing sealing strength to prevent fluid leakage from connected portions between the second opening 24 and the input passage 41 and between the discharge passage 17 and the output passage 42.

In the output block 6 attached with the electromagnetic proportion valve 9, further, an O-ring 30 made of rubber such as fluorocarbon rubber and a perfluoroelastomer is fitted between the first opening 23 of the V-shaped passage 16 and the secondary passage 15 of the communication block 5. Four bolts 31 are inserted through the output block 6, around the O-ring 30, and tightened in the communication block 5. In this state, the O-ring 30 is compressed with circumferentially uniform force between the communication block 5 and the output block 6 to prevent fluid leakage from a connected portion of the first opening 23 and the secondary passage 15.

Here, the electromagnetic proportion valve 9 will be explained briefly.

The electromagnetic proportion valve 9 includes a body 43 internally formed with the input passage 41 and the output passage 42, and a solenoid assembly 44 coupled to the body 43. The solenoid assembly 44 is configured to excite a fixed iron core 46 upon energization of a coil 45 to generate an attracting force in the fixed iron core 46 according to an energization quantity. A plunger 47 is movably placed between the body 43 and the solenoid assembly 44. The plunger 47 is made of a magnetic material in plate form. A resin valve sheet 48 is centrally placed on the plunger 47 and a plate spring 49 is welded to the plunger 47 to press the peripheral edge of the valve sheet 48 against the plunger 47. The plate spring 49 has a center hole uncovering the valve sheet 48. The body 43 is provided with a valve seat 50 between the input passage 41 and the output passage 42. The valve sheet 48 can be brought into or out of contact with the valve seat 50.

The electromagnetic proportion valve 9 is configured such that the plunger 47 is urged toward the valve seat 50 by a resilient force of the plate spring 49 during non-energization, thereby placing the valve sheet 48 into contact with the valve seat 50. Accordingly, the communication between the input passage 41 and the output passage 42 is closed to interrupt the flow of purge gas from the electromagnetic proportion valve 9.

In the electromagnetic proportion valve 9, on the other hand, upon energization of the coil 45, the fixed iron core 46 attracts the plunger 47 against the urging force of the plate spring 49 to bring the valve sheet 48 out of contact with the valve seat 50. A valve opening degree is adjusted according to the balance between the attraction force of the fixed iron core 46 that attracts the plunger 47 and the urging force of the plate spring 49 that urges the plunger 47 in a direction opposite to the fixed iron core 46. Thus, by controlling the energization quantity of the coil 45, the purge gas can be regulated in a small flow rate.

When the energization of the coil 45 is stopped, thereafter, the fixed iron core 46 stops from attracting the plunger 47. The plunger 47 is thus urged toward the valve seat 50 by the plate spring 49, thereby bringing the valve sheet 48 into contact with the valve seat 50. This places the electromagnetic proportion valve 9 in a valve closed state.

<Coupling Configuration of Purge Gas Units>

A coupling configuration of the purge gas units 1 is explained below.

As shown in FIG. 1, the purge gas units 1 are coupled to one another in such a way that the passage common block 2 of the input block 4 of one purge gas unit 1 is connected to the passage common block 2 of the input block 4 of an adjoining purge gas unit 1 with the connecting members 51 and 52.

Figure 4:
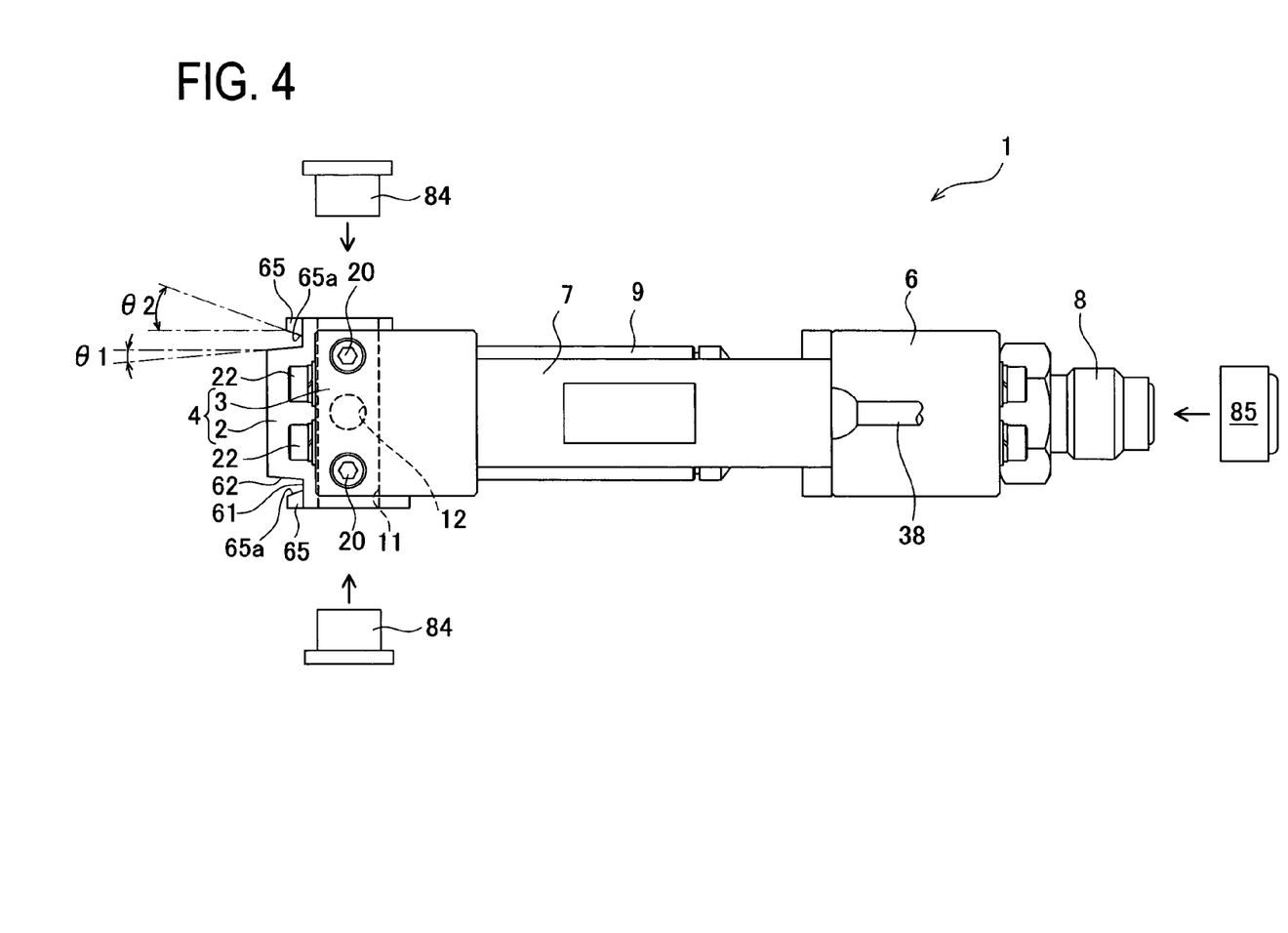
FIG. 4 is a plan view of the purge gas unit of FIG. 2.
Figure 5:
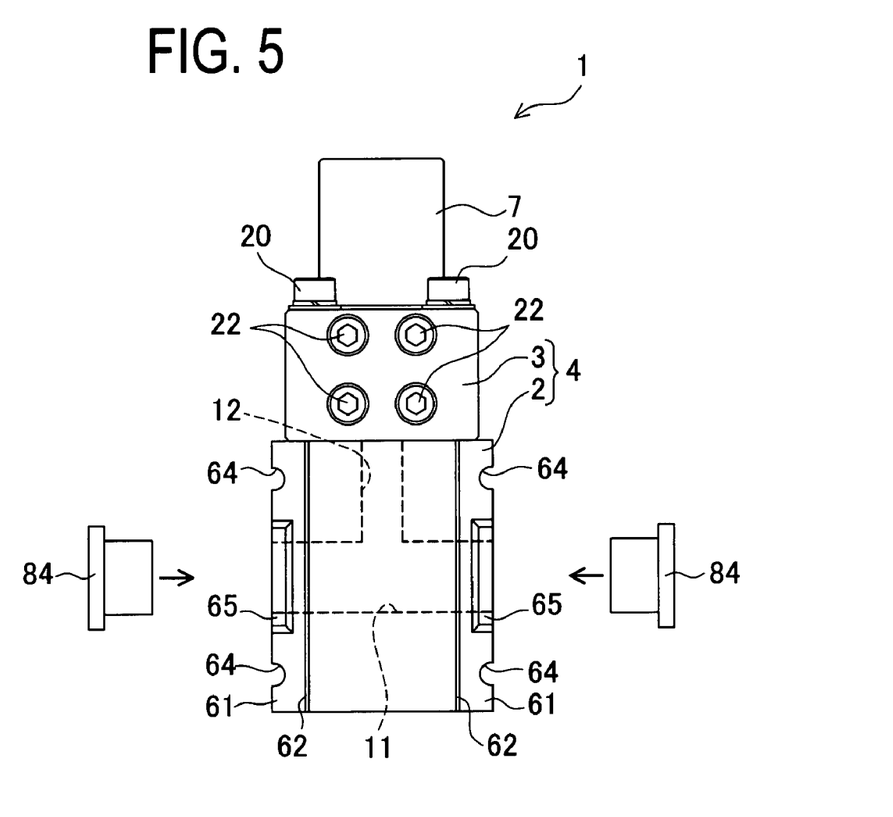
FIG. 5 is a side view of the purge gas unit of FIG. 2, seen from an input side.

FIG. 4 is a plan view of the purge gas unit 1 of FIG. 2. FIG. 5 is a side view of the purge gas unit 1 of FIG. 2, seen from the input side.

The passage common block 2 has symmetric side surfaces except that the upper surface has an opening of the input passage 12 while the lower surface has no opening.

As shown in FIGS. 4 and 5, the passage common block 2 includes stepped portions 61 formed along the edges of the input side surface and the edges of the output side surface respectively to receive the connecting members 51 and 52. Each stepped portion 61 includes an inclined surface 62 tapered toward the center of the input side surface or output side surface at an inclination angle 01.

As shown in FIG. 2, the passage common block 2 is formed with an annular groove 63 around an opening of the purge passage 11. The passage common block 2 is further formed with insertion grooves 64 which have a semicircular section and are arranged in parallel to each other above and below the annular groove 63. The passage common block 2 is provided with flanges 65 at diametrically opposed positions relative to the annular groove 63 to horizontally extend toward the input side and the output side respectively. Each of the flanges 65 has a thickness decreasing outward as shown in FIGS. 4 and 5. Specifically, each flange 65 has a flat contact surface that contacts with the adjoining passage common block 2 and an inclined surface opposite the contact surface to have an inclination angle θ2 with respect to the contact surface.

The configurations of the connecting members 51 and 52 are explained below.

As shown in FIG. 1, the adjoining purge gas units 1 are coupled to each other by holding respective input blocks 4 from the input side and the output side by the connecting members 51 and 52.

Figure 6A:
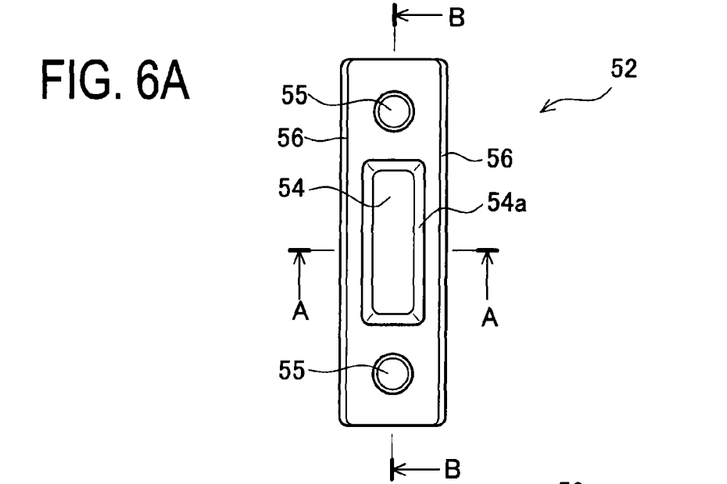
FIG. 6A is a front view of a connecting member shown in FIG. 1.
Figure 6B:
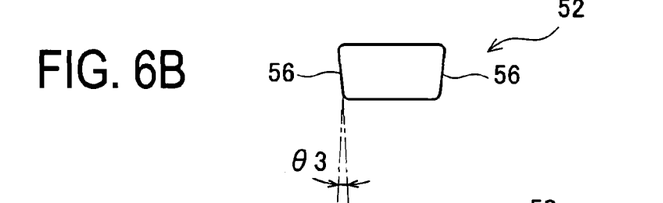
FIG. 6B is a top view of the connecting member of FIG. 6A.
Figure 6C:
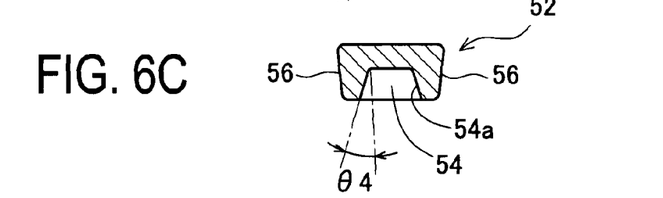
FIG. 6C is a sectional view of the connecting member taken along a line A-A in FIG. 6A.
Figure 6D:
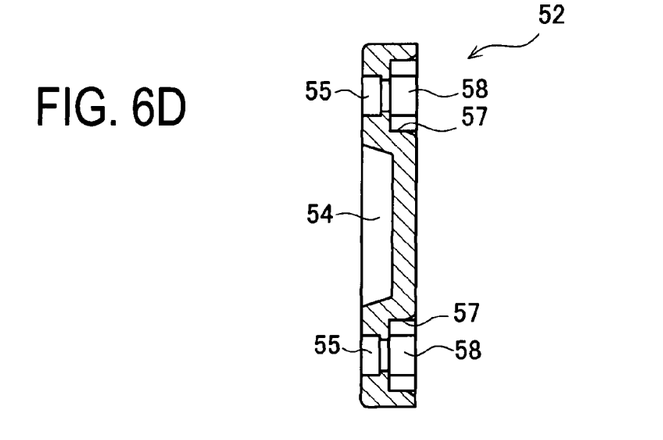
FIG. 6D is a sectional view of the connecting member taken along a line B-B in FIG. 6A.

FIG. 6A is a front view of the connecting member 52 of FIG. 1. FIG. 6B is a top view of the connecting member 52 of FIG. 6A. FIG. 6C is a sectional view of the connecting member 52 taken along a line A-A in FIG. 6A. FIG. 6D is a sectional view of the connecting member 52 taken along a line B-B in FIG. 6A.

The connecting member 52 is made of a material having the hardness equal to or lower than that of the material of the passage common block 2 in order to prevent deformation of the passage common block 2 when the purge gas units 1 are coupled to each other. In the present embodiment, as shown in FIGS. 6A and 6B, the connecting member 52 is made of aluminum in an nearly rectangular parallelepiped shape.

As shown in FIG. 6B, the connecting member 52 includes inclined surfaces 56 which face the inclined surfaces 62 of the passage common block 2. Each inclined surface 56 is inclined at an inclination angle θ3 which matches the inclination angle θ1 of the inclined surface 62 of the passage common block 2.

As shown in FIG. 6A, the connecting member 52 is formed with a recess 54 in the center of the side surface which engages with the stepped portions 61 of the passage common blocks 2. As shown in FIG. 6C, the recess 54 has an inner surface inclined at an inclination angle θ4 to match the shape of the flange 65. The inclination angle θ4 of the inner surface of the recess 54 is set to be equal to or slightly larger than the inclination angle θ2 of the flange 65.

Figure 7:
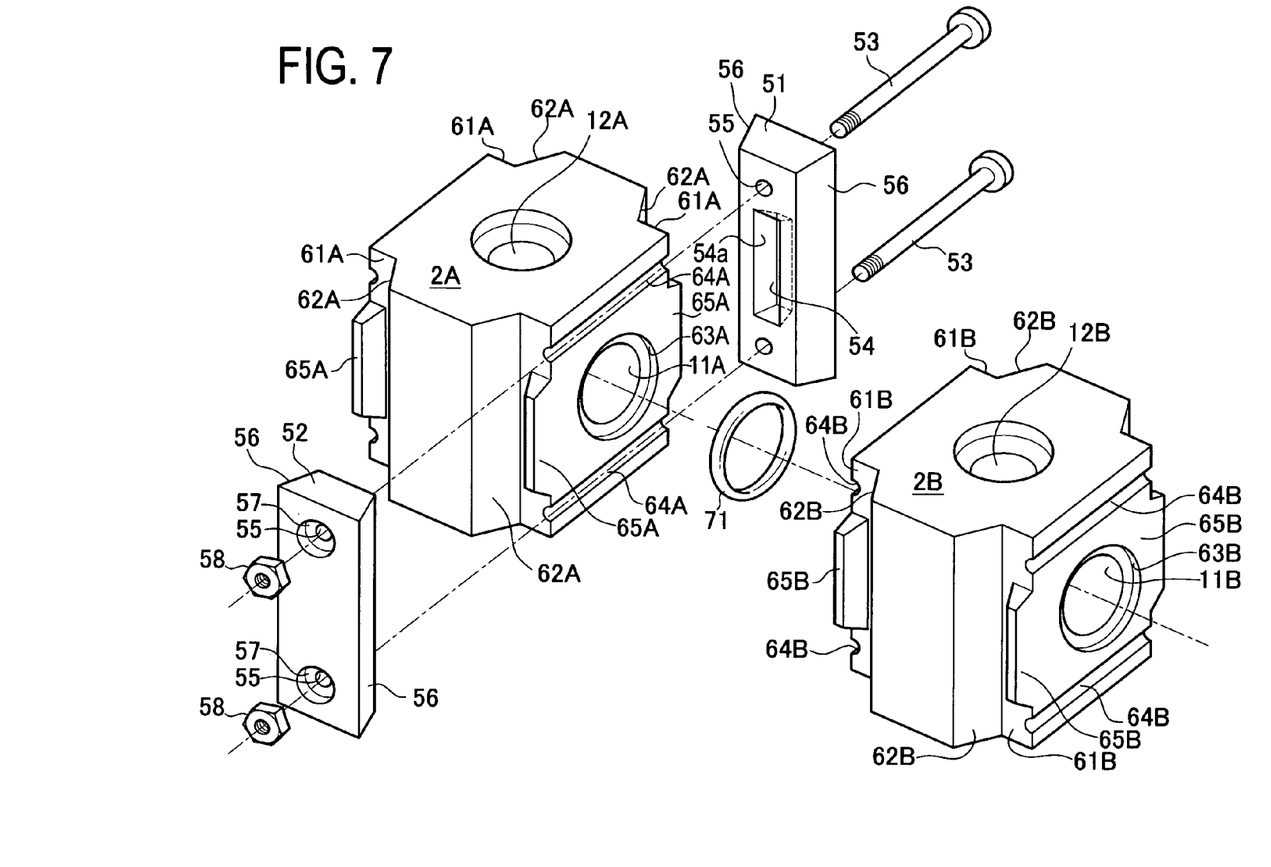
FIG. 7 is an exploded perspective view showing a coupling configuration of the purge gas unit shown in FIG. 1.

As shown in FIG. 6D, insertion holes 55 are formed above and below the recess 54 for receipt of the bolts 53 (see FIG. 7). The connecting member 52 is further formed with mounting holes 57 opening in the side surface opposite the recess 54 so as to be coaxial with the insertion holes 55. In each of the mounting hole 57, a high-rigid metal nut 58 is fixed with adhesion or the like.

The connecting member 51, which is not provided with the nut 58 in the mounting hole 57, is designed to receive the head of each bolt 53. Other configurations of the connecting member 51 are identical to those of the connecting member 52 and their explanations are omitted.

<Way of Integrating Purge Gas Supply Integrated Unit>

The purge gas unit 1 shown in FIG. 2 is assembled as below.

The direction changing block 3 is first fixed to the passage common block 2 with the bolts 20 to constitute the input block 4. The electromagnetic proportion valve 9 is fixed to the output block 6 with the bolts 27 and the output joint 8 is also attached to the output block 6. Successively, the flow sensor 7 is attached to the communication block 5. The input block 4 is secured to the input side surface of the communication block 5 with the bolts 22. The output block 6 is secured to the output side surface of the communication block 5 with the bolts 31. The purge gas unit 1 is thus completely assembled.

As shown in FIG. 1, the purge gas unit 1 assembled as above is fixed to the mounting plate 101 with bolts or the like. If a plurality of the purge gas units 1 are to be mounted, the adjoining purge gas units 1 are coupled to each other with the connecting members 51 and 52. This coupling way will be mentioned later.

As well as the purge gas unit(s) 1, the purge gas supply control unit 80 is fixed to the mounting plate 101 so that the pressure sensor 83 is connected to the purge passage 11 of the purge gas unit 1 placed next to the control unit 80. An outermost one of the purge gas units 1, opposite from the purge gas supply control unit 80, is attached with a closing member 84 to hermetically close the end of the purge gas common passage 90.

<Water Removal Work>

The purge gas supply integrated unit 100 integrated as above is subjected to a water removal work. The opening of each purge gas passage is closed with the stopper 85 to confine purge gas in each unit under pressure.

Specifically, the hand operated valve 81 of the purge gas supply control unit 80 and the electromagnetic proportion valve 9 of each purge gas unit 1 are opened, and dry purge gas of 120° C. to 140° C. or dry compressed air of 120° C. to 140° C. is supplied to the purge gas supply control unit 80. The purge gas input through the hand operated valve 81 will flow to the purge gas common passage 90 via the regulator 82 and the pressure sensor 83, flow in each purge gas unit 1 through the purge gas common passage 90, and then be output through the output joint 8 of each purge gas unit 1. At this time, the purge gas blows off water or moisture having adhered to the walls of the passages, and then the purge gas is discharged out of each unit while bearing away the water or moisture.

A moisture content of the purge gas discharged from each purge gas unit 1 is measured. When a measured moisture content decreases to a reference value or below, the supply of the purge gas is stopped. The stoppers 85 are screwed individually in an input side joint 86 of the purge gas supply control unit 80 and the output joint 8 of each purge gas unit 1 to close each opening of the passages. In this way, each unit 1 is sealed as containing the dry purge gas or dry compressed air under pressure.

The purge gas supply integrated unit 100 from which water or moisture has been removed as above is transported to a destination for use while the stoppers 85 and the closing member 84 remain attached to the passage openings. The stoppers 85 are detached in the destination place and the purge gas supply integrated unit 100 is incorporated in a semiconductor manufacturing system.

For example, in one of the purge gas units integrated as the purge gas supply integrated unit 100, failures may occur in the flow sensors 7, the electromagnetic proportion valves 9, and others. In such cases, the purge gas units 1 including broken components can be replaced individually with new purge gas units 1 that have been subjected to a water removal work. Thus, water or moisture has also been removed from the passages of each new purge gas unit 1.

The water removal from each new purge gas unit 1 is performed in a similar way to the aforementioned way for the purge gas supply integrated unit 100. However, this removal way will also be explained briefly.

One open end of the purge passage 11 is closed by the closing member 84 and the electromagnetic proportion valve 9 is opened. Then, dry purge gas of 120° C. to 140° C. or dry compressed air of 120° C. to 140° C. is supplied to the purge passage 11 through the other open end. When the moisture content of the purge gas output from the output joint 8 of the purge gas unit 1 decreases to the reference value or below, the supply of purge gas is stopped. The open end of the purge passage 11 is closed by the closing member 84 and the opening of the output joint 8 is sealed by the stopper 85. At this time, the dry purge gas or compressed air is confined under pressure in the flow passages of the purge gas unit 1.

In the destination for use, the closing member 84 and the stoppers 85 are removed from the new purge gas unit 1 from which water has been removed as above, and the new purge gas unit 1 is assembled to the existing purge gas unit 1 with the connecting members 51 and 52.

<Way of Coupling Purge Gas Units>

A way of coupling the purge gas units is explained below. FIG. 7 is an exploded perspective view showing the coupling configuration of the purge gas units 1 of FIG. 1. In FIG. 7, only the passage common blocks 2 directly contributing to the coupling of the purge gas units 1 are illustrated for facilitating the explanation. The passage common blocks 2 to be connected to each other are given additional codes "A" and "B" for distinction.

Passage common blocks 2A and 2B are arranged with a flange 65A of the block 2A and a flange 65B of the block 2B placed in contact with each other by interposing a seal member 71 made of fluorocarbon rubber between an annular groove 63A of the block 2A and an annular groove 63B of the block 2B. Thus, insertion grooves 64A of the block 2A and insertion grooves 64B of the block 2B are combined to form an insertion hole through which the bolts 53 are inserted respectively.

When the end faces of the passage common blocks 2A and 2B are made contact with each other, the stepped portions 61A and 61B are made continuous to form a recess between the inclined surfaces 62A and 62B. The connecting members 51 and 52 are then engaged in that recess in a simple manner that the inclined surfaces 56 and 56 are guided along the inclined surfaces 62A and the 62B to allow the recess 54 to engage with the flange 65A of the block 2A and the flange 65B of the block 2B whose end faces are held in close contact relation.

In this state, the bolts 53 are inserted through the insertion holes 55 of the connecting member 51 and the insertion grooves 64A and 64B of the passage common blocks 2A and 2B, and are tightened in the insertion holes 55 of the connecting member 52 with the nuts 58. Accordingly, the connecting members 51 and 52 clamp the connected portions of the blocks 2A and 2B from the input side and the output side. The passage common blocks 2A and 2B are thus coupled to each other.

Figure 8:
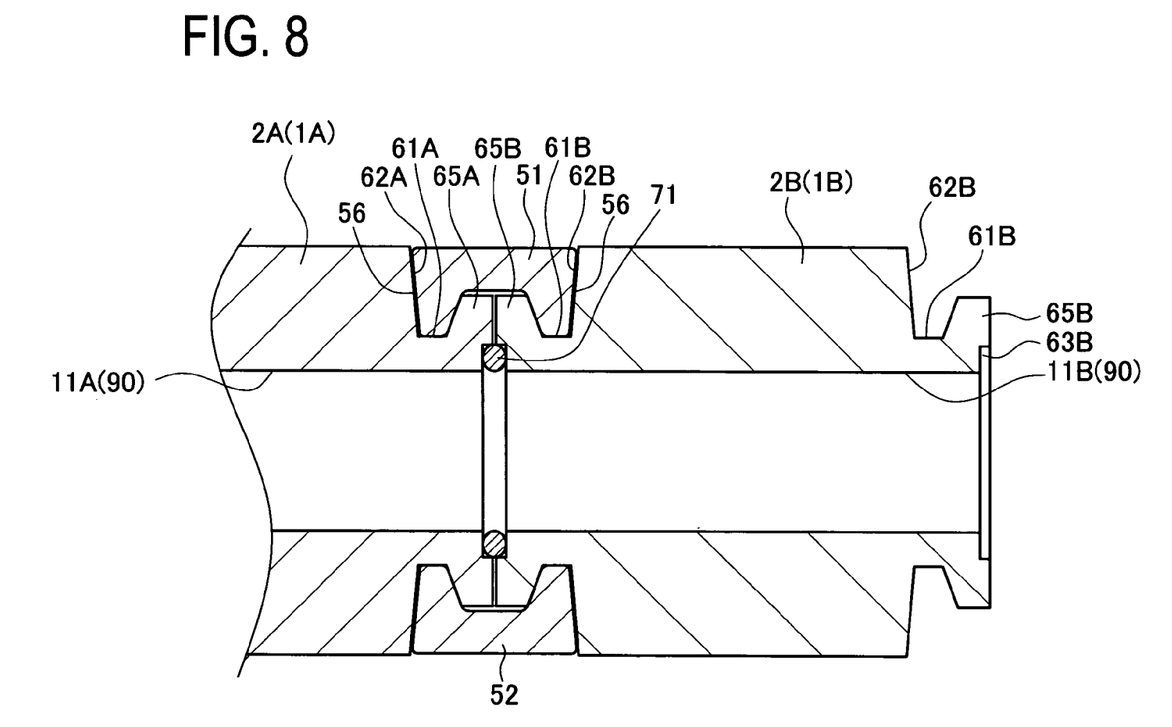
FIG. 8 is an enlarged sectional view showing a connected portion of a purge passage when the purge gas units are coupled.

FIG. 8 is an enlarged sectional view showing the connected portions of the purge passages 11A and 11B of the purge gas units 1A and 1B of FIG. 2 when coupled to each other. Also in FIG. 8, the purge gas units 1 (passage common blocks 2) are given additional codes "A" and "B" for facilitating distinction.

In the passage common blocks 2A and 2B, the flanges 65A and 65B are inclined at the angle θ2 to have a thickness decreasing outward. In the connecting members 51 and 52, each recess 54 has the opposite inner walls inclined at the angle θ4. Consequently, when the flanges 65A and 65B are engaged in each recess 54 of the connecting members 51 and 52, the tapered surfaces 65a of the flanges 65A and 65B are pressed by the inner tapered surfaces 54a of the recess 54, thereby holding the end faces of the flanges 65A and 65B in firmly contact relation with each other. This makes it possible to firmly compress the seal member 71 with circumferentially uniform force. Thus, purge gas is unlikely to leak from the connected portions even where the blocks 2A and 2B are placed in contact relation to connect the purge passages 11A and 11B.

<Circumstances of the Invention of Purge Gas Unit>

Figure 9:
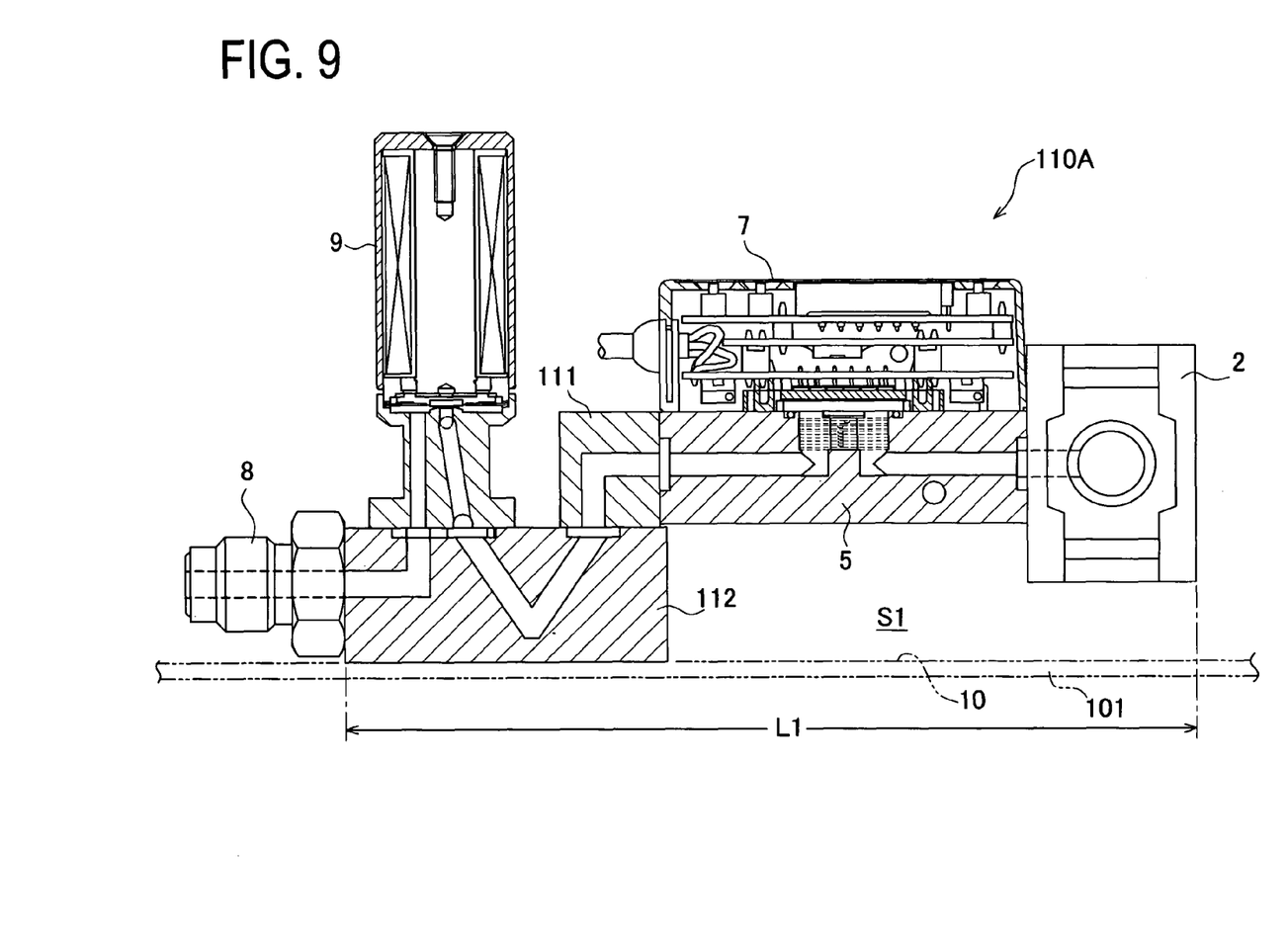
FIG. 9 is a partially sectional side view of a purge gas unit in a first modified form.
Figure 10:
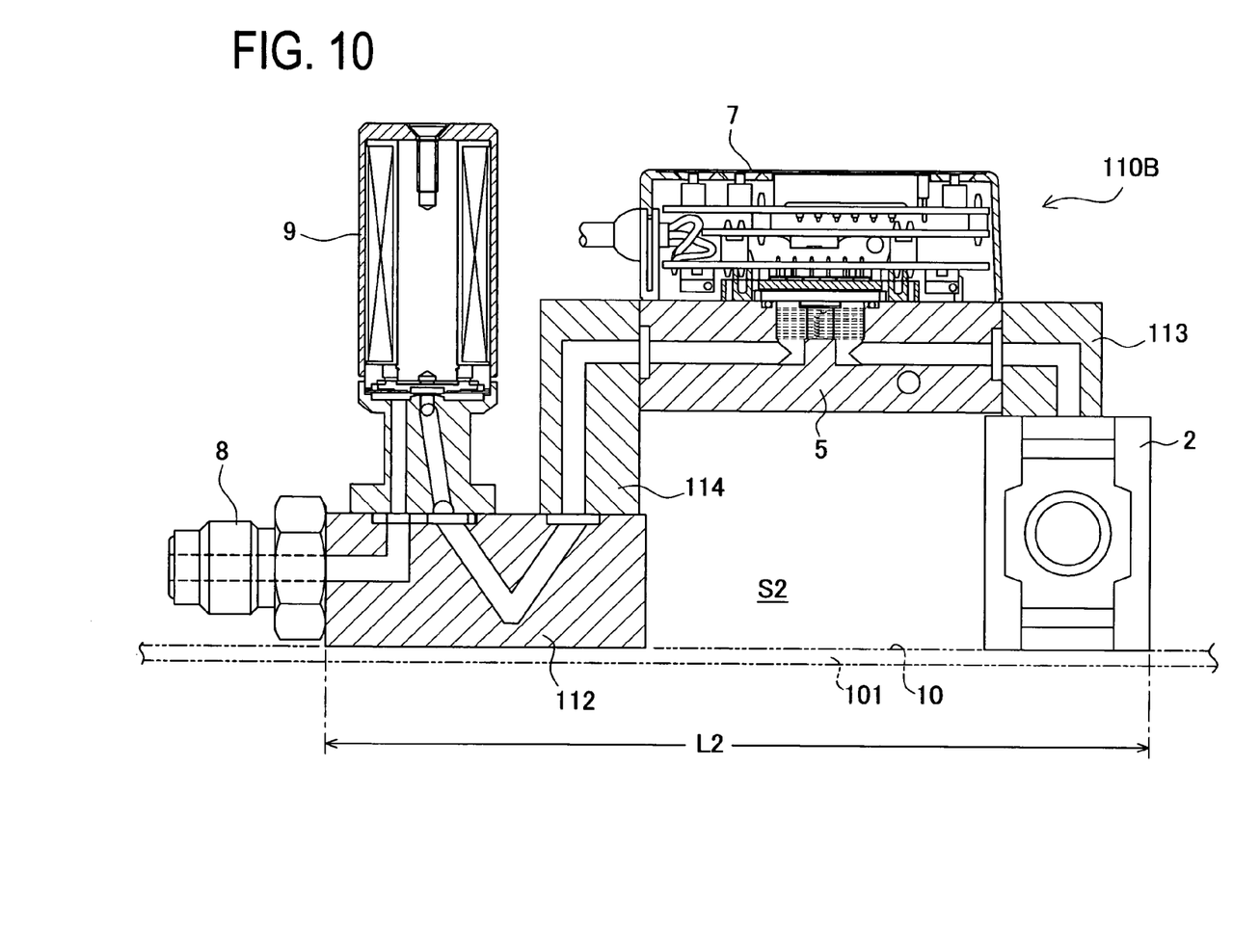
FIG. 10 is a partially sectional side view of a purge gas unit in a second modified form.

In the process of devising the purge gas unit 1 of the present embodiment, the inventors have come up with purge gas units 110A and 110B shown in FIGS. 9 and 10. FIG. 9 is a partially sectional side view of the purge gas unit in a first modified form. FIG. 10 is a partially sectional side view of the purge gas unit in a second modified form.

The inventors initially have hit on direct coupling of the purge gas units in order to reduce a foot space of the purge gas supply integrated unit 100, and then devised the shape of the passage common block 2 as shown in FIG. 9. To further reduce the foot space of the purge gas unit 110A, they have thought out a way of forming passages for purge gas by mutually connecting the passage common block 2, the communication block 5 attached with the flow sensor 7, the passage block 111 for changing the passage direction, and the passage block 112 attached with the electromagnetic proportion valve 9.

However, the purge gas unit 110A of FIG. 9 had a stability problem in installation due to a difference in height between the passage common block 2 side and the passage block 112 side. The space Si between the flow sensor 7 and the unit mounting surface 10 could also not be utilized effectively.

Then, the inventors thought out the purge gas unit 110B shown in FIG. 10, in which the passage common block 2 is arranged with its part is disposed under the communication block 5 and the passage common block 2 and the communication block 5 are communicated to each other through the passage block 113. Since the passage common block 2 is disposed under the communication block 5, the communication block 5 is located in a higher position and therefore a passage block 114 having an overall height larger than the passage block 111 of FIG. 9 is used to connect the communication block 5 and the passage block 112. This configuration could improve installation stability of the purge gas unit 110B. The entire length of the passages of the purge gas unit 110B could be reduced slightly than that of the purge gas unit 110A.

Also in this purge gas unit 110B, however, the space S2 between the communication block 5 and the unit mounting surface 10 remains effectively unused. Since the communication block 5 is located in the higher position, providing the space S2 larger than the space S1 shown in FIG. 9, the availability of the space S2 has been increased.

Consequently, the inventors have changed a conventional idea that a V-shaped passage is formed to face upward so that its openings open upward as shown in FIGS. 9 and 10 to another idea that a V-shaped passage 16 is formed to laterally face in the output block 6 as shown in FIG. 2. This makes it possible to transversely attach the electromagnetic proportion valve 9 to the output block 6 so that the electromagnetic proportion valve 9 is disposed in a transverse orientation in the space S. In this case, on the grounds that the axial length of the electromagnetic proportion valve 9 is larger than the communication block 5, the passage common block 2 is displaced slightly closer to the input side from under the communication block 5 and connected to the communication block 5 through the direction changing block 3.

In the purge gas unit 1 shown in FIG. 2, according to the position of the passage common block 2 displaced toward the input side for attachment of the electromagnetic proportion valve 9, the input block 4 needs a wider installation space. However, owing to the formation of the V-shaped passage 16 and the connection of the output block 6 in an upright position to the communication block 5, the installation space of the output block 6 is reduced to about one third of the installation space of the passage block 112 of FIGS. 9 and 10. By combination of a reduction in the installation area of the output block 6 and an increase in the installation area of the input block 5, the entire length L3 of the purge gas unit 1 could be reduced to about 80% of each of the entire lengths L1 and L2 of the purge gas units 110A and 110B shown in FIGS. 9 and 10.

Figure 11:
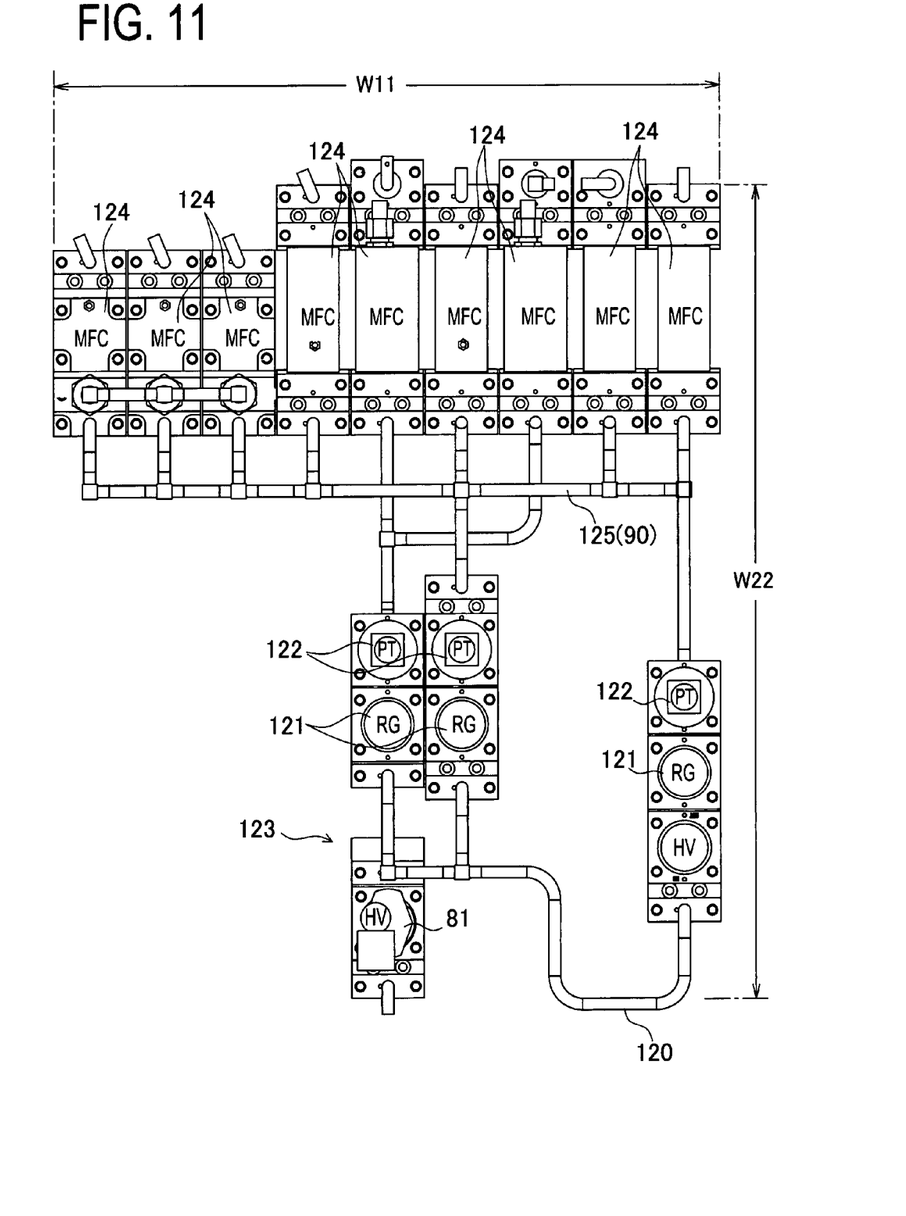
FIG. 11 is a view showing a case where conventional purge gas units are integrated to form the same passage configuration as a passage configuration shown in FIG. 1.

Consequently, the purge gas unit 1 has been devised as shown in FIG. 2 after the above trials. In the present embodiment, when the units 1 are coupled to each other with the connecting members 51 and 52 as shown in FIG. 1 and integrally mounted on the mounting plate 101 as well as the purge gas supply control unit 80, the integrated unit 100 is 301.28 mm in lateral width W1, 129.4 mm in vertical width W2, and 390 cm$^2$ in installation area On the other hand, the purge gas supply integrated unit shown in FIG. 11 is configured by using the purge gas units each mounting a mass flow controller 124 serving as the flow sensor 7 and the electromagnetic proportion valve 9. Specifically, each purge gas unit is coupled to the purge gas supply control unit 123 with pipes to provide the same passage configuration as in FIG. 1. The purge gas integrated unit of FIG. 11 is 360.5 mm in lateral width W11, 449.3 mm in vertical width W22, and 1332 cm$^2$ in installation area.

The purge gas supply integrated unit 100 of FIG. 1 can have a smaller lateral width W2 reduced to about 80%, a smaller vertical width W1 reduced to about 30%, and a smaller installation area reduced to about 30% as compared with the purge gas supply integrated unit shown in FIG. 11.

The reason why the purge gas supply integrated unit 100 of FIG. 1 can be downsized remarkably than the purge gas supply integrated unit of FIG. 11 is considered as including the following matters.

In the purge gas supply integrated unit shown in FIG. 11, it was considered to be hard to flow a large flow rate of fluid to the regulator 121, the purge gas supply control unit 123 is configured by connecting three regulators 121 in parallel relation, downstream from the hand-operated valve 81, and individually placing pressure sensors 122 downstream from the regulators 121. On the other hand, the purge gas supply integrated unit 100 shown in FIG. 1 includes the single regulator 82 in place of the regulators 121 and therefore the single pressure sensor 83 in place of the pressure sensors 122. Thus, the purge gas supply integrated unit 100 of FIG. 1 can eliminate the need of pipes 120 for connecting the plurality of regulators 121 shown in FIG. 11 and further can reduce the number of fluid control devices constituting the purge gas supply control unit, resulting in a reduction in apparatus size.

The purge gas supply integrated unit of FIG. 11 includes the plurality of mass flow controllers 124 connected to each of the pressure sensors 122 through pipes 125. That is, the pipes 125 configure the purge gas common passage 90. In the purge gas supply integrated unit 100 shown in FIG. 1, on the other hand, the purge units 1 are coupled to each other with the connecting members 51 and 52 to form the purge gas common passage 90. In other words, the purge gas units 1 in themselves are connected to one another to provide a manifold configuration. Accordingly, the purge gas supply integrated unit 100 of FIG. 1 can eliminate the need of piping space for the pipes 125.

<Functions and Effects>

As explained above, the purge gas unit 1 of the present embodiment in which the input block 4 for input of purge gas and the output block 6 for output of purge gas are connected to the communication block 5 from both sides thereof (see FIGS. 2 and 3) can need no pipes for supply of purge gas to the flow sensor 7 and pipes for connection between the flow sensor 7 and the electromagnetic proportion valve 9. Further, the output block 6 is formed with the V-shaped passage 16 in a laterally facing position and the electromagnetic proportion valve 9 is attached to the output block 6 so that the electromagnetic proportion valve 9 is placed in a transverse orientation in the space S between the lower surface of the communication block 5 and the unit mounting surface 10 of the mounting plate 101 (see FIGS. 2 and 3). Thus, the flow sensor 7 and the electromagnetic proportion valve 9 are arranged in two-tiered configuration without needing the installation space for the electromagnetic proportion valve 9. According to the purge gas unit 1 of the present embodiment as above, the removable piping space and installation space can be saved to reduce the foot space.

The purge gas unit 1 of the present embodiment is arranged such that the passage common block 2 of the input block 4 is coupled in surface contact with the passage common block 2 of the input block 4 of an adjoining purge gas unit 1 by use of the connecting members 51 and 52 (see FIGS. 1 and 7) to connect the purge passage 11 forming the purge gas common passage 90 to the purge passage 11 of the adjoining purge gas unit 1. According to the purge gas unit 1 of the present embodiment, the purge gas common passage 90 can be extended in such a manner that the input block 4 (the passage common block 2) of one purge gas unit 1 is connected to the input block 4 (the passage common block 2) of an adjoining purge gas unit 1 by use of the connecting members 51 and 52 to connect one purge passage 11 to an adjoining purge passage 11. This makes it possible to remove the need of pipes for forming the purge gas common passage 90, resulting in a reduction in foot space.

In the purge gas unit 1 of the present embodiment, while the end face of the flange 65 of the input block 4 is held in close contact with the end face of the flange 65 of the input block 4 of the adjoining purge gas unit 1, interposing therebetween the resin seal member 71, the flange 65 of the input block 4 and the flange 65 of the adjoining input block 4 are fitted together in the recess 54 of each of the connecting members 51 and 52 (see FIG. 8). It is therefore possible to prevent fluid leakage from the connected portions of the purge passages 11. It should be noted that a process gas unit generally includes a metal gasket serving as a metal seal for a passage connected portion for ensuring gas tightness to prevent outside leakage of corrosive gas or the like. On the other hand, the purge gas unit 1 is used to flow purge gas such as N$_2$ gas highly contained in air and compressed air. Therefore, the resin seal member 71 can be used in the passage region without causing any problem even though it is lower in sealing strength than the metal seal.

The purge gas unit 1 of the present embodiment includes the input block 4, communication block 5, and output block 6 that are made of aluminum. The purge gas unit 1 can therefore be manufactured in light weight and at low cost.

Here, a common aluminum passage block has an irregular passage surface, which makes it hard to remove water or moisture staying in recesses during a purge work. If the purge gas unit 1 just assembled is directly incorporated in a semiconductor manufacturing system, a purge work is likely to take a longer time.

In this view, the purge gas unit 1 of the present embodiment is subjected to a purge work after assembly to remove water or moisture with purge gas, and then the closing member 84 and the stoppers 85 are attached to respective passage openings (the opening of the purge passage 11 and the opening of the output joint 8) of the purge gas unit 1 to confine the purge gas in the passages under pressure.

Such purge gas unit 1 can avoid entry of air in the passages 11, 12, 13, 14, 15, 16, and 17 through the openings of the purge passage 11 and the output joint 8 during transport, thus preventing water or moisture from adhering to the passage surfaces. In a destination place for use, when the closing member 84 and the stoppers 85 are detached from the passage openings and the purge gas unit 1 is mounted in the semiconductor manufacturing system, air is allowed to flow in the passages 11, 12, 13, 14, 15, 16, and 17 through the openings of the purge passage 11 and the output joint 8. However, the time needed for the mounting work is short and thus only a small amount of water could adhere to the passage surfaces. Consequently, according to the purge gas unit 1 of the present embodiment, only a small amount of water or moisture could adhere to the passage surfaces during a work of mounting the unit 1 in the semiconductor manufacturing system. Thus, it does not take a longer purge time than necessary.

When the aforementioned purge gas units 1 are integrated, each having a small foot space, the purge gas supply integrated unit 100 can accordingly have a reduced foot space (see FIG. 1).

When the purge gas units 1 are integrated to constitute the purge gas supply integrated unit 100, each of the purge gas units 1 is supplied with purge gas to remove water or moisture from the passages. Then, the stoppers 85 and the closing member 84 are attached to the openings of the purge passages to confine the purge gas in the passages. This makes it possible to prevent air from entering the passage openings during transport and to avoid water from adhering to the inner walls of the purge gas common passage 90 and the passage of each purge gas unit 1. When the stoppers 85 are detached from the output joint 8 of each purge gas unit 1 and the input-side joint 86 of the purge gas supply control unit 80 before mounting the purge gas supply integrated unit 100 in the semiconductor manufacturing system, air will enter the purge gas passages through the passage openings. However, the mounting time is so short as to allow only a small amount of water to adhere to the passage surfaces. Consequently, an amount of water that adheres to the passage surfaces is small during the work of mounting the purge gas supply integrated unit 100 of the present embodiment in the semiconductor manufacturing system. Thus, it does not take a longer purge time than required.

The present invention may be embodied in other specific forms without departing from the essential characteristics thereof.

(1) For instance, in the above embodiment, the output block 6 is provided as a single block. Alternatively, it may include a combination of a passage block formed with the V-shaped passage 16 and a passage block formed with the discharge passage 17.

(2) In the above embodiment, the output joint 8 is attached to the purge gas unit 1. Alternatively, the purge gas unit 1 may be assembled without the output joint 8.

(3) Although the flow sensor 7 in the above embodiment is a thermal flow sensor, any flow sensors of flow measuring type such as a mass flow controller may be adopted.

(4) The electromagnetic proportion valve 9 in the above embodiment is used as an open/close control valve. Alternatively, an air-operated valve, an electromagnetic valve having a rod plunger, and so on may be used as the open/close valve.

(5) Although the seal member 71 is made of resin in the above embodiment, it may be replaced with a seal member made of rubber such as fluorocarbon rubber and a perfluoroelastomer.

(6) Although the connecting members 51 and 52 in the above embodiment are made of aluminum, they may be made of resin.

(7) In the above embodiment, the purge gas unit 1 is provided with the flow sensor 7 and the electromagnetic proportion valve (the open/close control valve) 9. An alternative design is to provide only the mass flow controller in the purge gas unit to use it as the flow sensor and the open/close control valve.

(8) Although the communication block 5 is configured in a single block in the above embodiment, a plurality of piping blocks may be connected to form the communication block.

(9) In the above embodiment, the input block 4 and the output block 6 are designed to be almost equal in height. The overall height of the input block 4 may be smaller or larger than the overall height of the output block 6. In this case, the purge gas unit 1 can be fixed to the mounting plate 101 while a block of a lower overall height is placed producing space above the mounting surface 10. Alternatively, a spacer may be placed under the block having a lower overall height to keep a horizontal posture of the flow sensor 7.

(10) In the above embodiment, the first and second openings 23 and 24 formed in the output block to open one above the other in the same surface are connected by the V-shaped passage 16. They may be connected by a different-shaped passage such as a U-shaped passage.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A purge gas unit comprising:
    an input block for input of purge gas into the purge gas unit;
    an output block for output of the purge gas from the purge gas unit, the output block including a first opening and a second opening formed opening one above the other in a side surface of the output block, and a communicating passage that connects the first and second openings in fluid communication to each other;
    a communication block attached to the input block and the output block placed on both sides of the communication block so that a space is provided between the communication block and a mounting surface;
    a flow sensor attached to an upper surface of the communication block to measure a flow rate of the purge gas that flows through the communication block; and
    an open/close control valve attached to the output block and placed in the space to communicate with the flow sensor through the communicating passage.

2. The purge gas unit according to claim 1, wherein the communicating passage is a V-shaped passage.

3. The purge gas unit according to claim 1, wherein the input block, the communication block, and the output block are made of aluminum.

4. The purge gas unit according to claim 3, wherein an output joint attached to the output block; and
    a stopper attached to each of the output joint and an opening of the purge passage, the stopper being arranged to confine the purge gas in the purge gas unit after the purge gas unit is subjected to a purge work by allowing the purge gas to flow in the input block and from the output block through the communicating passage.

5. A purge gas supply integrated unit comprising a plurality of the purge gas units set forth in claim 1.

6. The purge gas supply integrated unit according to claim 5, further comprising a closing member for closing the purge passage of an outermost one of the integrated purge gas units, and wherein each purge gas unit is arranged to confine the purge gas after subjected to a purge work by allowing the purge gas to flow in each purge gas unit to remove water or moisture therefrom.

* * * * *